UNITED STATES PATENT OFFICE.

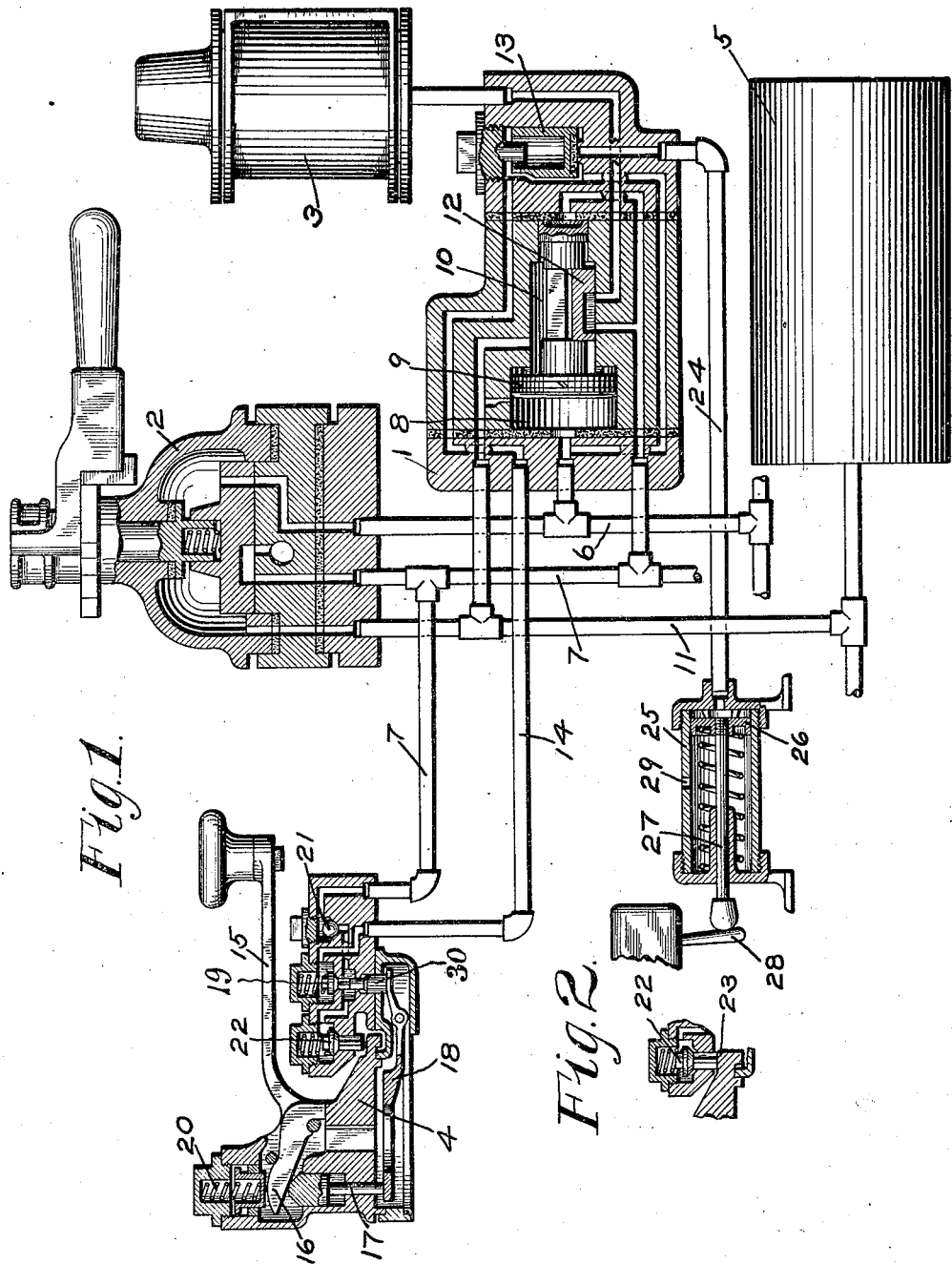

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL DEVICE.

1,390,595.     Specification of Letters Patent.     Patented Sept. 13, 1921.

Application filed October 18, 1919. Serial No. 331,650.

*To all whom it may concern:*

Be it known that I, THOMAS H. THOMAS, a citizen of the United States, residing at Edgewood, in the county of Allegheny and State of Pennsylvania, have invented new and useful Improvements in Safety Car-Control Devices, of which the following is a specification.

This invention relates to safety car control equipments, in which the brakes are applied and the power is cut off when the operator removes his hand from the controller handle.

It has been proposed to provide an equipment of the above character, in which means are provided whereby the making of a straight air application of the brakes prevents the operation of the apparatus to effect an emergency application of the brakes and to cut off the power, when the operator removes his hand from the controller handle.

It sometimes happens that power fails while the car is running and while the operator may then make a straight air application of the brakes to stop the car, he might get off the car, leaving the controller handle in a power on position, and then should the power come on again, it is possible that the straight air application of the brakes may not be sufficient to hold the car against the application of power tending to propel the same.

The principal object of my invention is to provide means for causing an emergency application of the brakes and the opening of the power circuit when the controller handle is left in a power on position and the hand is removed from the controller handle, even if a straight air application of the brakes has been made, so as to prevent the car from starting up under conditions such as stated above or similar conditions.

In the accompanying drawing; Figure 1 is a diagrammatic view of a safety car control equipment embodying my invention, and Fig. 2 a section of a portion of the controller handle device, showing the additional check valve lifted in a power on position.

As shown in the drawing, the safety car equipment may comprise a straight air emergency valve device 1, a brake valve device 2, a brake cylinder 3, a safety controller handle device 4, a reservoir 5, an emergency brake pipe 6, and a straight air pipe 7.

The emergency valve device 1 may comprise a casing having a piston chamber 8 connected to brake pipe 6 and containing a piston 9 and a valve chamber 10 connected by pipe 11 to reservoir 5 and containing a slide valve 12 adapted to be operated by piston 9.

Included in the emergency valve casing is a relay valve 13 subject on one side to the pressure in the safety control pipe 14 and operated upon venting fluid from the safety control pipe for opening a vent from the emergency brake pipe 6 so as to operate the piston 9 and valve 12 for effecting an emergency application of the brakes.

The safety controller handle device 4 may comprise a pivoted removable handle 15, having a finger 16 adapted to engage a pin 17, one end of which rests on one end of a lever 18. The lever 18 is pivotally mounted and its opposite end engages a pilot valve 19.

The vent from the relay valve 13 is connected by a pipe 24 with a circuit breaker cylinder 25, containing a piston 26, having a stem 27, adapted to operate a circuit breaker switch arm 28, for opening the power circuit.

When the handle is held down by the hand of the operator, the pilot valve 19 is held seated, but if the operator removes his hand from the controller handle, a spring 20 acts through the handle 15 and the pin 17 to depress the lever 18, so that the pilot valve 19 is opened and fluid is vented from the safety control pipe 14, past a check valve 21 to the straight air pipe 7, provided a straight air application of the brakes has not been made.

The venting of fluid from the safety control pipe 14 causes fluid to be vented from the brake pipe 6 to the pipe 24.

Piston 26 is then operated to throw the switch 28 and open the power circuit and when the piston 26 passes over the exhaust port 29, fluid is vented from pipe 24 and the emergency brake pipe 6 so as to cause the piston 9 to operate valve 12 for supplying fluid to the brake cylinder 3, to effect an emergency application of the brakes.

If a straight air appplication of the brakes has been made, the check valve 21 will be held seated by straight air pressure, so that fluid will not be vented from the safety control pipe to effect an emergency application of the brakes when the pilot valve 19 is opened by the release of the controller handle.

According to my invention, in order to cause an application of the brakes when the controller handle is released in a power on position of the handle even where a straight air application of the brakes has been made, an additional check valve 22 is provided for controlling an atmospheric vent port leading to the pilot valve 19. The check valve 22 is adapted to be operated by a cam or projecting portion 23 on that portion of the controller which moves with the handle.

The cam portion 23 is arranged so as to engage and lift the valve 22 in any power on position of the controller, so that if the controller handle 15 be released in a power on position, the cam portion 23 having lifted the valve 22 from its seat, fluid will be vented from the safety control pipe past the valve 22 to the atmosphere when the pilot valve 19 is opened, due to the release of the controller handle, so that an emergency application of the brakes and the opening of the power circuit will be effected in the manner hereinbefore described, even if a straight air application of the brakes has previously been made.

In order to prevent possible leakage of fluid past the stem of the pilot valve 19, when the pilot valve is in its open position, a valve 30 may be formed on the pilot valve stem, so that upon opening the pilot valve 19, the valve 30 will seat and prevent leakage.

Having now described my invention, what I claim as new, and desire to secure by Letters Patent, is:—

1. In a safety control equipment, the combination with a controller handle, of mechanism effective upon release of the controller handle for applying the brakes and cutting off the power, means operative upon a straight air application of the brakes for rendering said mechanism ineffective, and means for rendering said straight air controlled means ineffective in a power on position of the controller handle.

2. The combination with a safety control pipe, a reduction in pressure in which is adapted to effect an emergency application of the brakes, a straight air pipe, a controller handle, and a pilot valve operated upon release of the controller handle for venting fluid from the safety control pipe to the straight air pipe, of means operated upon movement of the controller handle to a power on position for opening another connection through which fluid is vented from the safety control pipe.

3. The combination with a safety control pipe, a straight air pipe, a controller handle, and a pilot valve operated upon release of the controller handle for venting fluid from the safety control pipe to the straight air pipe, of a valve operated by the controller handle for opening an additional vent from the pilot valve.

4. The combination with a safety control pipe, a straight air pipe, a controller handle, and a pilot valve operated upon release of the controller handle for venting fluid from the safety control pipe to the straight air pipe, of a cam portion associated with the controller and movable with the controller handle and a valve operated by said cam portion in a power on position of the controller handle for opening an additional vent from the pilot valve to the atmosphere.

5. In a safety car control equipment, the combination with a controller handle, of a pilot valve operated upon release of the controller handle for venting fluid to effect an emergency application of the brakes and cut off the power and means inoperative in a power on position of the controller for opening a vent port to said pilot valve, said means being inoperative in the power off position of the controller handle.

6. In a safety car control equipment, the combination with a controller handle, of a pilot valve operated upon release of the controller handle for venting fluid to effect an emergency application of the brakes and means for preventing leakage past the stem of the pilot valve when in open position.

7. In a safety car control equipment, the combination with a controller handle, of a pilot valve operated upon release of the controller handle for venting fluid to effect an emergency application of the brakes and a valve associated with the pilot valve for preventing leakage past the stem of the pilot valve when the pilot valve is in open position.

In testimony whereof I have hereunto set my hand.

THOMAS H. THOMAS.